No. 796,408.  PATENTED AUG. 8, 190
I. G. BERGENSTROLE.
ADJUSTABLE PIPE.
APPLICATION FILED JULY 8, 1904.
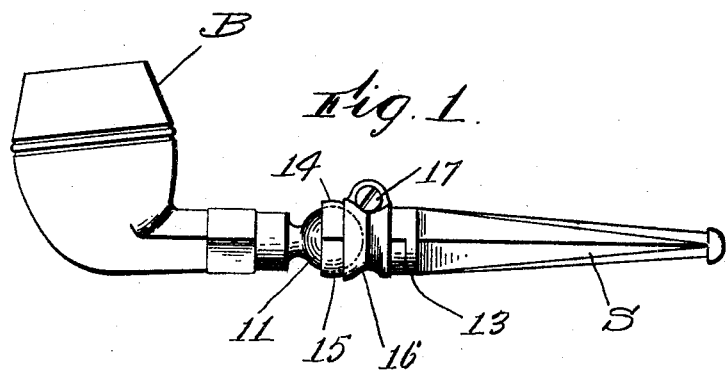
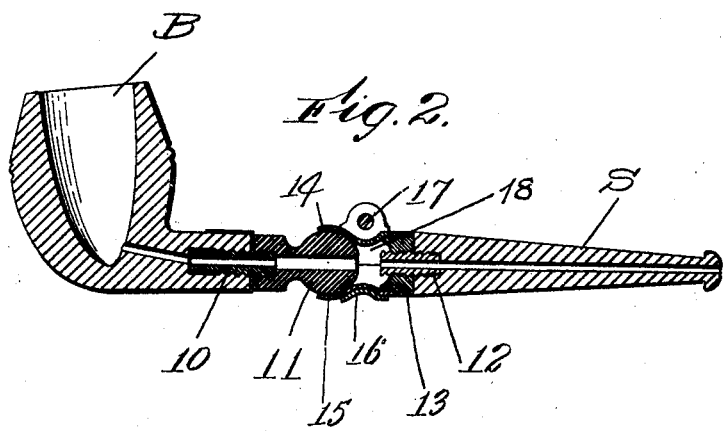
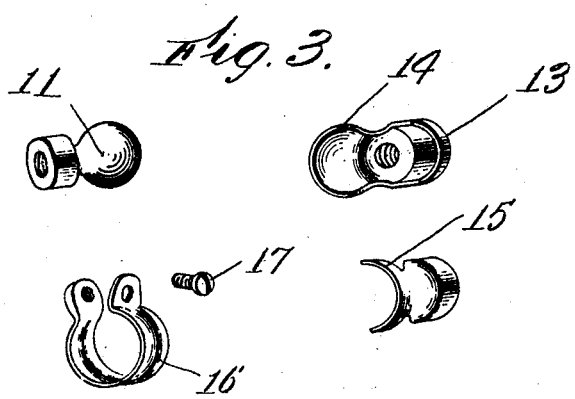
Witnesses:
Inventor:
I G Bergenst
By his Attorneys

UNITED STATES PATENT OFFICE.

IVAR G. BERGENSTROLE, OF WORCESTER, MASSACHUSETTS.

ADJUSTABLE PIPE.

No. 796,408. Specification of Letters Patent. Patented Aug. 8, 1905.

Application filed July 8, 1904. Serial No. 215,720.

*To all whom it may concern:*

Be it known that I, IVAR G. BERGENSTROLE, a citizen of the United States, residing at Worcester, in the county of Worcester and State of Massachusetts, have invented a new and useful Adjustable Pipe, of which the following is a specification.

The object of this invention is to provide a new and improved construction of pipe by which the bowl can be adjusted to occupy any position relatively to the stem and communication still maintained between the bowl and the stem, so that the pipe can be smoked in any adjusted position to suit the fancy of the smoker.

The device is shown in the accompanying drawings, referring to which—

Figure 1 is a side elevation of the same. Fig. 2 is a sectional elevation, and Fig. 3 is a detail view of the parts of the joint in the stem separated from each other.

In detail, B designates the bowl, and S the stem, of the pipe. Threaded into the bowl is a nipple 10, which has a hole bored through the same in a direction toward the bottom of the bowl-opening. Screwed onto the nipple 10 is a spherical section 11, which has a hole through the same to line with the hole in the nipple 10. A similar nipple 12 is screwed into the stem S, so that the hole through the same will line with the hole in the stem. Screwed onto the same is a hub 13, which has soldered or brazed thereto one section 14 of a two-part hollow partial spherical section.

15 designates the mating hollow partial sphere.

The parts 14 and 15 are engaged with the spherical portion 11, and a clamp 16 is snapped around the same and held in place by a screw 17. By adjusting the screw 17 the parts 14 and 15 can be secured together, so as to nicely engage the spherical portion 11. The parts 14 and 15 abutting against each other provide a tight joint between themselves and the spherical section 11, and by reason of the space 18 left outside of the nipple 12 the bowl B can be adjusted to any desired position relatively to the stem S within the range permitted by the joint and communication still kept between the bowl and stem. By this construction the bowl and stem can be set at various angles or directions to each other and the pipe used with the parts in these positions.

I am aware that it is old to provide a pipe with a flexible stem or to provide a ball-joint between the bowl and stem of a pipe whereby the two can be folded together; but my invention distinguishes from these devices in that one spherical section is made hollow, as at 18, beyond the surface which engages the other spherical section, whereby the bowl and stem may be set at any desired position relatively to each other, sidewise or up and down, and held in such position by the friction of the ball-joint, communication still being maintained between the bowl and stem.

The details of my improvement may be greatly varied by a skilled mechanic without departing from the scope of my invention as expressed in the claims—as, for instance, the spherical section 11 can be applied to the stem instead of to the bowl.

Having thus fully described my invention, what I claim, and desire to secure by Letters Patent, is—

1. In a jointed structure for smoking tobacco, the combination of the tobacco-receiving part, a stem, a spherical section attached to one of these parts, a two-part hollow partial spherical section connecting the spherical section to the other part, and means for clamping the parts of the two-part spherical section together.

2. In a pipe, the combination of a bowl, a stem, a spherical section attached to one of these parts, a two-part hollow partial spherical section, one part of which is connected to the other part of the pipe and the other part of which is loose, and a clamp for binding the two parts together to engage the spherical section.

3. In a pipe, the combination of a bowl, a stem, hollow nipples threaded into each of these members, a spherical section screwed on one of said nipples, one part of a corresponding hollow partial spherical section screwed on the other of said nipples, a part matching therewith to complete the hollow partial spherical section, and a clamp for binding these two parts together.

In testimony whereof I have hereunto set my hand in the presence of two subscribing witnesses.

IVAR G. BERGENSTROLE.

Witnesses:
LOUIS W. SOUTHGATE,
PHILIP W. SOUTHGATE.